Aug. 11, 1936.   W. H. MOSS   2,050,366
COMPOSITION OF MATTER CONTAINING SYNTHETIC RESINS
Filed April 12, 1933
FIG_1_
FIG_2_
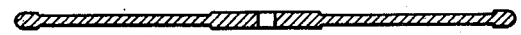
Inventor
William H. Moss
by
J Seltzer and Bufferman
Attorneys Patented Aug. 11, 1936

2,050,366

UNITED STATES PATENT OFFICE 2,050,366

COMPOSITION OF MATTER CONTAINING SYNTHETIC RESINS

William Henry Moss, London, England, assignor to Celanese Corporation of America, a corporation of Delaware Application April 12, 1933, Serial No. 665,644
In Great Britain April 27, 1932

6 Claims. (Cl. 274—41)

This invention relates to compositions of matter containing synthetic resins and particularly to compositions comprising phenolic resins.

I have discovered that liquid and solid compositions of matter which are very suitable for use as varnishes, in the production of moulded articles and for other purposes may be obtained by incorporating certain particular types of phenolic resins with vegetable oils, and the present invention therefore consists in the production of liquid or solid compositions of matter by the incorporation of certain classes of phenolic resins with vegetable oils.

The composition may of course contain any other suitable materials, as for example solvents, diluents and filling or colouring materials.

The synthetic resins employed according to the present invention are those obtained by condensing halogenated ketones or aldehydes with phenols, or by condensing aliphatic or other ketones and/or aldehydes, e. g. acetone and formaldehyde, with halogenated, and particularly chlorinated, phenols, e. g. ortho- and para-chlor phenol and para-chlor-meta-cresol. These synthetic resins, obtained from halogenated materials are hereinafter referred to as "halogenated phenolic resins". A further type of synthetic resin employed according to the present invention is formed by condensing aliphatic or other ketones or aldehydes with compounds obtainable by the condensation of a ketone with a phenol, e. g. phenol itself, or cresol, xylenol or other homologue, in the approximate proportions of two molecules of a phenol to one molecule of a ketone. The best known example of such compounds is diphenylol-propane, which is a crystalline compound obtained by condensing two molecules of phenol with one molecule of acetone in the presence of an acid catalyst. These synthetic resins, obtained by condensing such compounds with a ketone or an aldehyde, are hereinafter referred to as "phenol-ketone resins". While the production of the phenol-ketone resins may be carried out by the reaction of an aldehyde and/or ketone upon the previously formed phenol-ketone compound, it is of course not necessary that this compound should be isolated, and the resin may be produced in a single stage reaction by reacting suitable quantities of phenol and ketone, together, if necessary, with aldehyde. Processes for the production of these resins are described in U. S. Patents Nos. 1,848,644 and 1,878,249 and U. S. application S. No. 227,871 filed October 21st 1927. The resins produced by condensing halogenated phenols with ketones and/or aldehydes may quite simply be produced by directly condensing the reagents in the presence of a suitable catalyst. Thus for example, a halogenated phenol may be mixed with formalin (approximately a 40% solution of formaldehyde) and heated with a catalyst under a reflux condenser. Other suitable resins which may be used are those obtained by condensing phenols with halogenated ketones or aldehydes, e. g. phenol-chloracetone resin. In general I find that the resins obtained from ketones have a better compatibility with the oils than have those obtained from aldehydes, and they are thus of wider application for the purposes of the present invention.

Among the oils which may be employed according to the present invention, I have found that oils of the linseed and castor oil groups are most generally useful. Thus, in addition to linseed and castor oils themselves which are especially valuable other oils such as perilla oil, poppy seed oil, rape oil, sesame oil, tung oil and soya bean oil may be employed. When drying or semi-drying oils are employed they may be used raw, but are particularly valuable in an oxidized, partially oxidized or polymerized form, e. g. boiled or blown, since in general it is found that the process of boiling or similarly treating oils improves their solvent properties for the resins.

The process is not, of course, limited to the use of only one oil, and mixtures, for example mixtures of linseed oil and castor oil, may if desired be employed. Nor is the invention limited to the use of one kind of synthetic resin and in fact, more than one kind of synthetic resin may be employed with one or more vegetable oils.

According to the process of the present invention the compositions of matter are obtained by incorporating one or more synthetic resins of the types above specified with one or more vegetable oils. Thus, the synthetic resins may be ground up in a ball mill either alone, until a finely divided powder is produced, or together with a part of the vegetable oil (in which subsequently the synthetic resin is proposed to be incorporated) until a fine paste is produced, and the resulting powder or paste may then be incorporated with the bulk of the vegetable oil. The dissolution of the resin in the oil may be assisted by means of heat and agitation. Alternatively, compounds obtained in any of the stages preceding the actual formation of the final resin, may be incorporated in the oil and the reaction then carried to completion, or the raw materials for making the synthetic resin, e. g. a ketone and a phenol, may be incorporated in the oil and allowed, or caused, to react in this medium. If desired the admixture of either or both constituents in the oil may be facilitated by the use of suitable solvents added either separately at any stage or as solutions containing the reactants. Again, the resin itself may be dissolved in a suitable solvent and the solution added to the oil. Such solvents may be removed, if desired, in any suitable manner during or after completion of the reaction in the oil or the formation of the resin-in-oil solution. For example such solvents may be distilled from the composition, if they are sufficiently volatile. The solvents may be so chosen however, particularly when the resin-oil composition is intended to be used as a varnish or coating composition, that their presence in the final composition is of value.

The compositions obtained according to the present invention may also contain any other suitable constituents whether liquid or solid. Among such constituents may be mentioned other lacquer bases or plastic materials such as natural, semi-synthetic and synthetic resins, e. g. rosin, ester gum, shellac, the resins sold under the registered trade mark "Glyptal", the oil-soluble resins produced by reaction between a higher phenol such as xylenol, and an aldehyde and the oil-soluble phenol-formaldehyde resins obtained by treating ordinary phenol-formaldehyde resins with certain natural resins. Again, cellulose derivatives may be added, e. g. cellulose esters and ethers such as cellulose nitrate, acetate, stearate, palmitate and butyl and benzyl celluloses. Such cellulose derivatives may be added in the form of finely divided powders, or in solution. For example, when a phenol-acetone resin is formed in the presence of an oil, cellulose acetate or other cellulose derivative may be dissolved in the acetone from which the resin is to be formed. Again cellulose derivatives which are soluble in liquids which are miscible with the resin oil compositions, e. g. benzene and other hydrocarbons, may be incorporated in the form of solutions in such solvents. Colouring matters such as dyes or pigments may also be incorporated. Again, particularly where the compositions are to be employed as varnishes, suitable fire-proofing agents may be incorporated e. g. sodium tungstate and sodium phosphate. The compositions may also contain plasticizers e. g. chlorinated napthalenes, the mono-methyl xylene sulphonamides, ethyl toluene sulphonamide, organic phosphates, e. g. tricresyl phosphate and triphenyl phosphate, and phthalates e. g. diethyl phthalate and dibutyl phthalate. Such plasticizers, are, however, preferably employed in relatively small amounts. Other substances which may be added to liquid compositions are solvents and thinners, e. g. turpentine and petroleum thinners, and driers (when drying and semi-drying oils are used), while solid and semi-solid compositions may contain wood-meal, cotton flock, cellulosic materials such as chemical wood-pulp, inorganic materials, e. g. silica, lithopone, china clay, slate dust, asbestos, zinc oxides and other suitable fillers, and substances having a lubricating action, e. g. stearic acid and its organic and inorganic esters such as calcium and butyl stearates. Waxes, preferably animal or vegetable waxes, may also be added to the compositions, e. g. beeswax, and candilila and carnauba waxes. In general, and particularly where the compositions are to be employed for gramophone records, it is preferable that the proportion of waxes be comparatively small, e. g. 1 to 2% on the total solids.

The following examples serve to illustrate the invention but are not to be considered as limiting it in any way.

Example 1

The following composition is highly valuable for the manufacture of moulded products, e. g.. gramophone records:—

|  | Parts |
|---|---|
| Diphenylol-propane formaldehyde resin | 58 |
| Castor oil | 20 |
| Linseed oil | 10 |
| China clay | 30 |
| Silica | 10 |
| Slate powder | 10 |

The composition is heated and stirred until a product of the desired consistency is obtained.

Example 2

A similar composition to that described in Example 1 is made up employing, instead of the castor oil therein used, the product which is obtained by distilling castor oil under a vacuum of about 10 mms. until 50% of its weight is distilled over. The undistilled material is used in place of the castor oil, in the same amount. This composition is also highly valuable in the manufacture of gramophone records.

Example 3

A further composition suitable for moulding purposes, e. g. in the production of gramophone records comprises:—

|  | Parts |
|---|---|
| Diphenylol-propane formaldehyde resin | 34 |
| Diphenylol-propane acetone resin | 20 |
| Castor oil | 20 |
| Perilla oil, either boiled or raw | 10 |
| Filler | 60 |

Example 4

A composition containing

|  | Parts |
|---|---|
| Diphenylol-propane formaldehyde resin | 65 |
| Castor oil | 23 |
| Boiled linseed oil | 12 | together with a suitable proportion of fillers and if desired colouring materials and other substances is very suitable for the production of gramophone records and other moulded articles.

Example 5

A varnish composition suitable for coating the surfaces of gramophone records and for other coating purposes is made up by mixing the following substances:

|  | Parts |
|---|---|
| Fused and water-free diphenylol-propane formaldehyde resin having a melting point of 100 to 140° C | 10 |
| Boiled linseed oil | 40 |
| Lead cobalt drier | 2 |
| Turpentine | 15 |
| Petrol | 15 |

The accompanying drawing illustrates blanks for gramophone records made in accordance with the processes of the present invention, but these drawings are not to be considered as limiting the invention in any way.

Fig. 1 illustrates in sectional elevation a blank for a gramophone record, comprising a base of any suitable material 3 and a coating 4 of a novel composition of the present invention.

Fig. 2 illustrates in sectional elevation a blank for a gramophone record made from any of the novel compositions of the present invention.

As stated above, the compositions obtained according to the present invention may be either liquid or solid and may be employed for various purposes as for example, varnishes or in the production of moulded articles. In addition they may also be used as bonding or impregnating agents, for example in the production of laminated articles from paper, fabrics, glass or other materials, for coating surfaces or articles of metal, wood, stone, concrete, compositions or other materials, as primers for cellulose derivative lacquers and as wood-fillers, while if the constituents are suitably chosen, compositions having a good electrical resistance may be obtained which are suitable for coating wire, impregnating cotton or other materials used in the protection or insulation of conductors and in the production of moulded parts for use in the electrical industry. For such purposes the compositions preferably should not contain constituents which are water soluble or hygroscopic, or other materials calculated to decrease their electrical resistance. Moreover, as already indicated, plastic compositions obtained according to the present invention are very suitable for use in the production of gramophone records.

What I claim and desire to secure by Letters Patent is:—

1. A record having sound grooves comprising a composition containing a synthetic resin selected from the group consisting of halogenated phenolic resins and phenol-ketone resins and also comprising a vegetable oil.

2. A record having sound grooves comprising a composition containing a diphenylol propane-acetone resin and linseed oil.

3. A record having sound grooves comprising a composition free from cellulose derivatives and containing a diphenylol propane-acetone resin and linseed oil.

4. A record having sound grooves comprising a composition containing a diphenylol propane-formaldehyde resin and boiled linseed oil.

5. A record having sound grooves comprising a composition free from cellulose derivative and containing a diphenylol propane-formaldehyde resin, boiled linseed oil, and castor oil.

6. A record having sound grooves comprising a composition free from cellulose derivatives and containing a diphenylol propane-formaldehyde resin, a diphenylol propane-acetone resin, boiled linseed oil, and castor oil.

WILLIAM HENRY MOSS.